(12) United States Patent
Schaefer

(10) Patent No.: US 7,766,151 B2
(45) Date of Patent: Aug. 3, 2010

(54) PICKING STATION

(75) Inventor: Gerhard Schaefer, Neunkirchen (DE)

(73) Assignee: SSI Schaefer Peem GmbH, Graz (AT)

( * ) Notice: Subject to any disclaimer, the term of this patent is extended or adjusted under 35 U.S.C. 154(b) by 1367 days.

(21) Appl. No.: 10/541,730

(22) Filed: Jul. 7, 2005

(65) Prior Publication Data
US 2008/0014060 A1 Jan. 17, 2008

Related U.S. Application Data

(63) Continuation of application No. PCT/EP2004/013073, filed on Nov. 18, 2004.

(30) Foreign Application Priority Data

Jan. 7, 2004 (DE) .................. 10 2004 001 841

(51) Int. Cl.
B65G 47/46 (2006.01)
(52) U.S. Cl. .................... 198/370.04; 198/370.01
(58) Field of Classification Search ............ 198/370.01, 198/370.04, 370.03, 370.1
See application file for complete search history.

(56) References Cited

U.S. PATENT DOCUMENTS

| | | | |
|---|---|---|---|
| 1,832,410 A | | 11/1931 | Myers |
| 3,147,845 A | * | 9/1964 | Harrison et al. ........ 198/370.04 |
| 4,846,335 A | * | 7/1989 | Hartlepp ................ 198/370.04 |
| 5,509,538 A | * | 4/1996 | Spindler et al. ........ 198/370.01 |
| 2004/0197171 A1 | | 10/2004 | Freudelsperger ............ 414/281 |
| 2004/0200692 A1 | * | 10/2004 | Tanaka .................. 198/370.01 |

FOREIGN PATENT DOCUMENTS

| | | |
|---|---|---|
| DE | 298 06 960 U 1 | 4/1998 |
| DE | 101 36 354 A 1 | 7/2001 |

OTHER PUBLICATIONS

Patent Cooperation Treaty (PCT), International Search Report (Form PCT/ISA/210) for PCT/EP2004/013073, dated Mar. 10, 2005, with Forms PCT/ISA/220 & PCT/ISA 237.

* cited by examiner

*Primary Examiner*—James R Bidwell
(74) *Attorney, Agent, or Firm*—McNeely Bodendorf LLP

(57) ABSTRACT

A picking station for picking articles out of storage containers by a picking person, the picking station being connected to a conveying system which has a conveying track leading through a working area of the picking person, at least for the inward transport of storage containers, wherein the conveying track is tilted about its longitudinal axis in the direction of the picking person, at least in the working area of the picking person.

18 Claims, 4 Drawing Sheets

PICKING STATION

RELATED APPLICATIONS

This is a continuation application of co-pending International Patent Application PCT/EP2004/013073 filed on Nov. 18, 2004 which claims priority of German application DE 10 2004 001 841.3 filed on Jan. 7, 2004 which is fully incorporated by reference herewith.

BACKGROUND OF THE INVENTION

The present invention relates to a picking station for picking articles out of storage containers by a picking person, the picking station being connected to a conveying system which has a conveying track leading through a working area of the picking person, at least for feeding storage containers.

Furthermore, the present invention relates to a method for picking orders at such a picking station.

In addition, the present invention relates to a picking system.

RELATED PRIOR ART

Such a picking station, such a system and such a method for picking orders are known from DE 101 36 654 A1.

DE 101 36 354 A1 discloses a picking method and a picking system for commissioning, having a container store and an associated storage and retrieval unit for removing containers from and storing containers in the container store in relation to at least two picking stations.

The term "container" is not to be seen as restrictive but, instead, is to be understood as an example of a large number of possible storage units, such as trays, pallets and so on, which can be used to store and to transport goods to be picked for an order. Under the term "article" are to be understood all those goods which can be stored in a container store. Articles can be, for example, medicaments, tool parts or the like, which can be ordered by customers in any desired number and multiplicity. These ordered articles are then combined to form a single order, the articles then being picked and placed in an order container, which is delivered to the customer.

In a picking system, a picking station is understood as the location where a picking person removes articles which are stored in the storage containers in order then to deposit these in order containers provided.

An order container is understood to be a container in which goods or articles to be picked for an order are deposited. An order container is able to accommodate a large number of different articles until the order associated with it is finished, i.e. until all the articles associated with the order are transported from the storage to the picking station, and, there, are placed in the corresponding order container by the picking person.

Recently, a change has been made for configuring the picking operation in accordance with the principle of "goods to man". In the goods-to-man principle, the picking person is allocated a fixed workstation, from which he moves away as little and as rarely as possible. The articles to be picked for an order are transported to the picking person. This increases the efficiency of the overall system and fulfills the high ergonomic requirements which nowadays are becoming more and more prominent.

In addition, in the aforementioned DE 101 36 354, the storage containers are transported by means of an appropriate conveying system to the picking stations, where the picking person remains stationary. The picking person operates standing at this picking station. The storage containers are transported in at arm or handling height by means of a conveying system. The order containers are "parked" at a lower level, directly in front of the picking person. The order containers are parked in an order container buffer, which can accommodate up to four order containers. The order container buffer is likewise connected to a conveying system, which transports empty order containers to the picking station and finished order containers away from the picking station.

Before the picking person can remove an article from a storage container, the appropriate storage container is transferred from the storage container conveying system, which can be implemented by a roller track, for example, into a storage container buffer which, in a manner similar to the order container buffer, is able to accommodate a plurality of storage containers and is not part of the conveying system. The storage container buffer is arranged at a level above the order container buffer, in a region where the picking person can reach into the storage containers located in the storage container buffer without having to move away from the point at which he stands. The storage container buffer is, for example, arranged within reach of arm. The storage container buffer can accommodate up to three storage containers simultaneously, which are arranged beside one another in front of the picking person, so that the latter can reach into one of the storage containers as desired at any time in order to remove an article.

The storage container buffer is constructed in such a way that the edges of the storage containers oriented toward the picking person are lowered slightly, so that the picking person can more easily oversee the content of the storage container arranged in front of him.

One disadvantage in this case is that the number of interplays is often too low. An interplay is understood to mean an operation in which a storage container is transferred from the roller track into the storage container buffer or a storage container is transferred from the storage container buffer to the roller track. This is because, inter alia, the number of storage containers which can be stored in the storage container buffer is so low.

Furthermore, for each space in the storage container buffer a sluice device for feeding and discharging of storage containers has to be provided, with the aid of which storage containers can be transferred between the conveying roller track and the storage container buffer.

The consequence of this likewise, that the overall efficiency of the system suffers.

SUMMARY OF THE INVENTION

It is therefore an object of the present invention to provide a picking station, a system and a method for picking articles from storage containers by a picking person as a result of which the picking efficiency can be increased while taking note of strict ergonomic requirements.

This object is achieved by a picking station of the type mentioned at the outset in which the conveying track is tilted about its longitudinal axis in the direction of the picking person, at least in the working area of the picking person.

This object is further achieved by a picking system which includes at least one picking station according to the invention.

The object is further achieved by a method for picking orders of the type mentioned at the outset in which storage containers are transported to a picking station according to the invention, the storage containers being brought into a tilted position before they reach the working area.

As a result of tilting the conveying track itself, the provision of a storage container buffer, in particular a storage container buffer tilted toward the picking person, is superfluous. The picking person is readily able to reach into storage containers transported to him, in order to remove articles to be picked for an order, without having to move away from the picking station.

Since the storage container buffer known from the prior art is dispensed with, it is also possible for the sluice devices to be dispensed with. The speed at which the storage containers can be transported to the picking station is increased. No more interplays between the conveying track and a buffer are required. In addition, the problem that there is only a limited number of storage container buffer spaces is rendered superfluous, since the storage containers can be brought directly to the picking person via the conveying track and "flow" past him.

As a result of tilting the conveying track itself, from ergonomic points of view it is simple for the picking person to reach into the storage container. The picking person can oversee the content of the storage container very well. He no longer has to walk to and fro at the picking station. The goods are transported directly to him in a comprehensible manner.

According to a preferred embodiment, the conveying track has a tilting device which tilts storage containers to be transported into the working area into a tilted position.

The tilting device permits rapid and selective tilting of the storage containers. On account of the often very meager space available for the picking station, it is often not possible to change the conveying track from its horizontal orientation into a tilted orientation over a sufficiently long distance, since the change must take place continuously. Otherwise, undesired torsional forces occur in the track and/or the articles in the storage containers could all be damaged by excessively abrupt tilting.

By means of the tilting device, the conveying track can be tilted only shortly before the working area. The tilting device can be configured to be controllable, so that the speed at which the storage containers are brought from their "normal" horizontal orientation into the tilted position can be varied as desired. This can be important in the case of articles that are easily broken, which, in the event of excessively abrupt tilting of the storage container, possibly strike a wall of the storage container and then break.

Furthermore, it is preferred if the conveying track is tilted substantially only in the working area of the picking person.

This has the advantage that the conveying track is oriented normally, that is to say horizontally, in the rest of the area, so that in these normal areas high transport speeds can be achieved. The distances over which the storage containers can thus be moved at maximum speed are thus longer. The "obstacle" in the flow of the storage containers, which is constituted by the picking station, at which, for example, orders are picked by hand, is thus as small as possible and therefore disrupts the overall flow less. The obstacle of the storage container buffers is avoided completely.

It is also advantageous if the tilting device is arranged before the working area.

If the tilting device is arranged before the working area, the storage containers come into the working area in an already tilted position and do not have to be tilted there. The picking person has a good view of the content of the storage containers from the start. He can already detect the content from a distance and prepare himself for the impending order picking action. Prior tilting also permits working independent of the picking rate of a human being. The picking person is supplied with a plurality of storage containers one after another in the working area, so that the fluctuating working speed of a human being (and also the different amount of work) can be balanced out optimally by means of normal onward cycling. Furthermore, moving the storage containers out of and into a storage container buffer, as is known from the prior art, is superfluous, so that time is gained and safety is increased, so that in particular pinching and jamming of the picking person's extremities during the changing of storage containers from the storage container conveying system into the storage container buffer and vice versa can be avoided.

According to a further preferred embodiment of the invention, the conveying track also has a tilt-back device, which tilts a storage container back from the tilted position into the normal position again.

As a result of tilting back into the normal, that is to say horizontal, position, the maximum speeds of the conveying track can be run again. The flow already mentioned above is impeded as little as possible.

It is also advantageous if the tilt-back device arranged after the working area.

As a result of the arrangement after the working area, storage containers can get more quickly into and out of the working area. The action of tilting the storage containers back is not carried out until outside the working area.

According to a preferred embodiment, the conveying track is a roller track or a conveying belt.

In the case of roller tracks and conveying belts, tilting the track in the region of the workstation can be brought about particularly simply without a great deal of technical effort having to be expended, such as would be the case, for example, in hanging conveyors.

It has also proven to be advantageous if the conveying track is arranged in the working area at handling height, in particular at chest to hip height, of the picking person.

As a result of arranging the conveying track at handling or hip height, the strict ergonomic requirements are fulfilled particularly well. The picking person does not have to bend in order to remove articles to be picked for an order from the storage containers. Disadvantageous movements of the trunk are avoided. Fatigue phenomena occur less early in the picking person.

Furthermore, it is preferred if the working area is defined by the arm reach of the picking person.

This means that the picking person does not have to crane or stretch in order to reach articles in the storage containers. The picking person can handle the articles to be picked for an order in a simple way, in order then to deposit them in order containers provided.

It is also advantageous if the conveying system also transports order containers, into which articles are picked for an order from the storage containers, to and/or away from the picking station.

For this purpose, appropriate interfaces must be provided in the conveying system before and after the picking station, with the aid of which storage containers and order containers transported jointly by the conveying system can be separated for the picking station.

It will be appreciated that the features mentioned above and those still to be explained below can be used not only in the respectively specified combination but also in other combinations or on their own without departing from the scope of the present invention.

Exemplary embodiments of the invention are illustrated in the drawing and will be explained in more detail in the following description.

DESCRIPTION OF PREFERRED EMBODIMENTS

Figure 1:
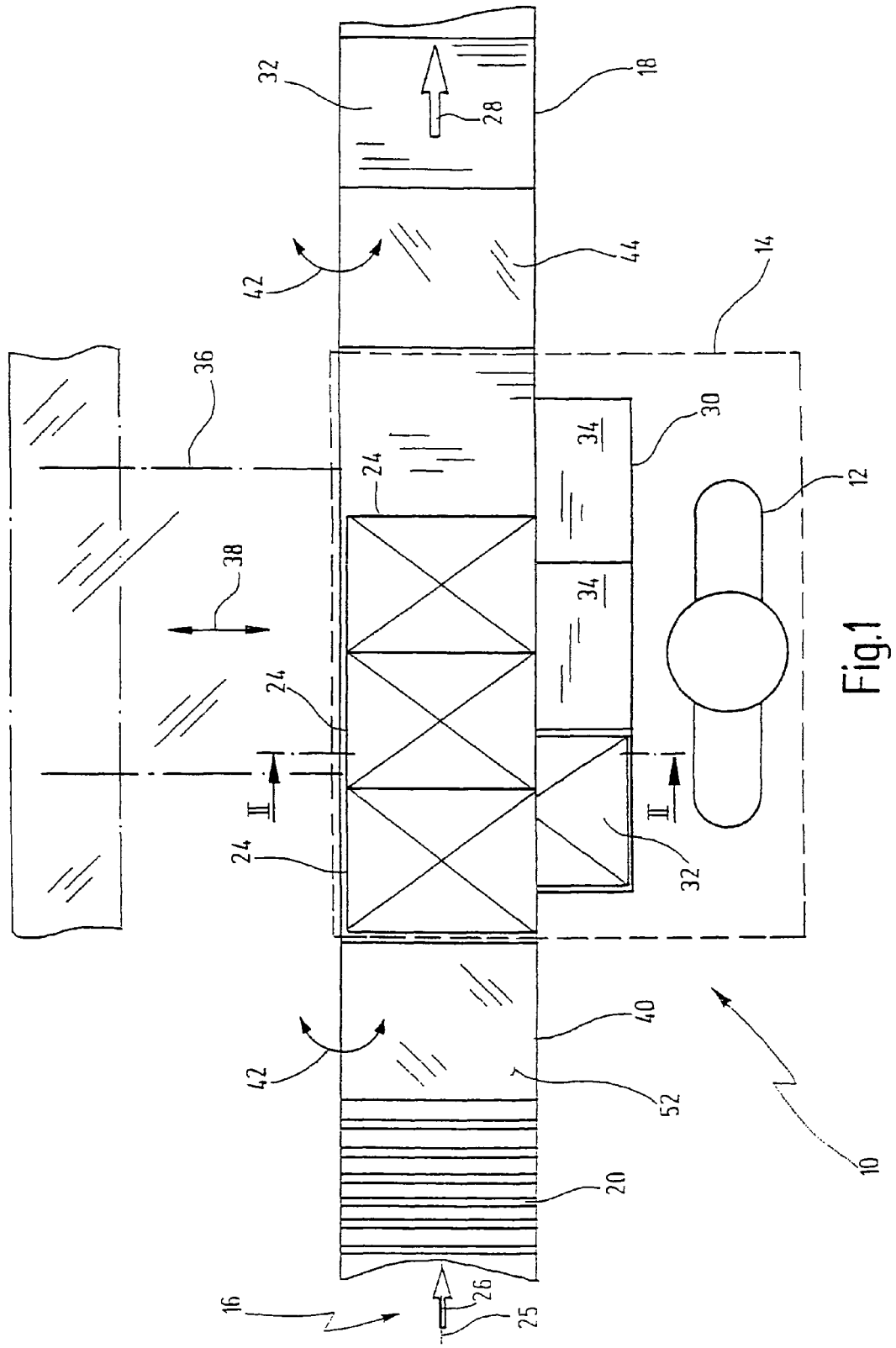
FIG. 1 shows a schematic plan view of a picking station according to the invention.

A picking station according to the invention will be designated generally by the reference numeral 10 in the following.

FIG. 1 shows a schematic plan view of a picking station 10 according to the present invention. The picking station 10 is operated by a picking person 12, who stays in a working area 14 and acts in this working area 14.

The working area 14 can, for example, be defined by the arm reach of the picking person 12. The picking person 12 preferably does not move away from the point at which he stands, so that articles (not illustrated) to be picked for an order have to be brought within the range of the hands or arms of the picking person 12.

The working area 14 of the picking station 10 is traversed by a conveying system 16. The conveying system 16 can be a conveying track 18, for example a roller track or a conveying belt. Indicated schematically at the left-hand edge of FIG. 1 is a roller track 20, the dark lines representing the rollers of the roller track 20. A conveying belt 22 is illustrated schematically at the right-hand edge of FIG. 1. It goes without saying that, normally, only one type of conveying track or conveying system is used in a picking system. However, a combination is also possible.

Furthermore, FIG. 1 reveals storage containers 24, which are represented by rectangles provided with a cross. The storage containers 24 in the example of FIG. 1 are transported from the left in the direction of an arrow 26 over the roller track 20 to the picking station 10. The arrow 26 is oriented parallel to the longitudinal axis 25 of the conveying track 18. The storage containers 24 are transported away, or are removed, along an arrow 28. The storage containers 24 are transported away when the picking person 12 in the working area 14 has removed the requisite number of articles (not illustrated) to be picked for an order from an appropriate storage container 24. Arranged underneath the conveying track 18 in the working area 14 is a buffer 30 for order containers 32. The buffer 30 in the example shown here has three buffer spaces 34, of which only the buffer space 34 illustrated on the left in FIG. 1 is occupied by an order container 32. The order containers 32 are transported into and out of the working area 14 by means of a further conveying system 36, as indicated schematically by an arrow 38.

Provided shortly before the working area 14 is a tilting device 40, which is part of the conveying track 18. With the aid of the tilting device 40, storage containers 24 which are located on the tilting device 40 can be brought into a tilted position. For this purpose, the tilting device can be tilted in the direction of an arrow 42.

Shortly after the working area 14, a tilt-back device 44 is provided, which is likewise part of the conveying track 18. With the aid of the tilt-back device 44, storage containers 24 can be tilted back from the tilted position into a horizontal position. Normally, the horizontal position constitutes the normal position of a storage container 24 in a picking system.

In the following text, the sequence of an picking operation at the picking station 10 will be explained briefly by using an example.

Storage containers 24 which contain articles to be picked for an order are conveyed in by a superordinated storage administration system, not illustrated here, from a store, which is likewise not illustrated here, and are transported to the picking station 10 over the conveying system 16. At the same time or previously, empty or prepared order containers 32 are transported into the order container buffer 30 via a conveying system 36. The conveying systems 16 and 36 can be identical. This operation is also coordinated by the superordinated storage administration. The superordinated storage administration can be organized, for example, by a large capacity computer or a PC which has appropriate storage administration software.

The storage containers 24 are transported via the roller track 20 to the picking station 10 or working area 14, preferably at maximum speed and already in the correct sequence.

In order to bring the storage containers 24 into a tilted position which is clear and ergonomically beneficial for the picking person 12, the tilting device 40 is arranged shortly before the working area 14. This can be, for example, immediately before or else some storage container lengths before in order to set up a type of serial buffer before the working area 14.

The tilting device 40 illustrated in FIG. 1 can be tilted about the longitudinal axis 25 of the conveying track 18 such that an edge of the storage container 24 that faces the picking person 12 is lower than an edge of the storage container 24 facing away from the picking person 12. In the example of FIG. 1, this means that the lower edge, closest to the picking person, of the storage container 24 is arranged lower down than the upper edge. The tilting device 40 has means for transporting a storage container 24 deposited thereon in the direction of the arrow 26. Furthermore, it has, for example, pneumatic, hydraulic or electromechanical means for tilting an area 52, on which the storage container 24 can be placed by the conveying track 18 or onto which storage containers 24 can be pulled, conveyed or transported.

After the tilting device 40 has been brought into the tilted position, and thus also a storage container 24 located thereon, the storage container 24 is guided into the working area 14 in the direction of the arrow 26. There, the picking person 12 can reach into the storage container 24 in order to remove one or more articles (not illustrated) to be picked for an order. The article or articles removed can subsequently be deposited by the picking person 12 in an available storage container 32. Should there still be further articles to be picked for an order in the order container, the appropriate storage containers 24 are transported into the working area 14 in the manner described above.

The storage containers 32 themselves can also be subdivided into a plurality of regions which contain different articles.

Therefore, the picking station 10 can also have a light source, such as a laser, which is arranged above the picking person 12 in order to illuminate the storage container 32. By using the specific illumination of the storage container 32, the picking person 12 knows immediately which articles are to be handled. By using the same technology, the destination, that is to say an order container 32 itself or, should the latter likewise be subdivided into a plurality of regions, one of these regions can be indicated. Such an optical apparatus is not shown in the figures but can optionally be provided.

Once all the articles necessary to complete an order have been picked and placed in the appropriate order container 32, the latter is transported away from the buffer 30 by the conveying system 36 and a new, empty or prepared order container 32 can be transported into the buffer 30 by means of the conveying system 36.

The storage container 32 from which the article to be picked for an order has been removed is transported out of the working area 14 in the direction of the arrows 26 and 28 subsequent to the removal.

The tilt-back device 44 is provided directly after the working area 14. For this purpose, the tilt-back device 44 has previously been brought into its tilted position. The storage container 24 is moved onto the tilt-back device 44. The tilt-back device 44 tilts the storage container 24 back into the normal position.

The tilt-back device 44 also has means in order to move the storage container 24 toward the conveying track 18 in the direction of the arrow 28 or to fetch the storage container 24 out of the working area 14. Furthermore, the tilt back device 44, just like the tilting device 40, has means for tilting the area on which the storage container 24 is standing around the longitudinal axis 25.

After the storage container 24 has been tilted back into the normal position, it is guided back again by means of the conveying track 18, here by means of a conveying belt 22, into the storage rack, not illustrated here, to be put into store.

Figure 2:
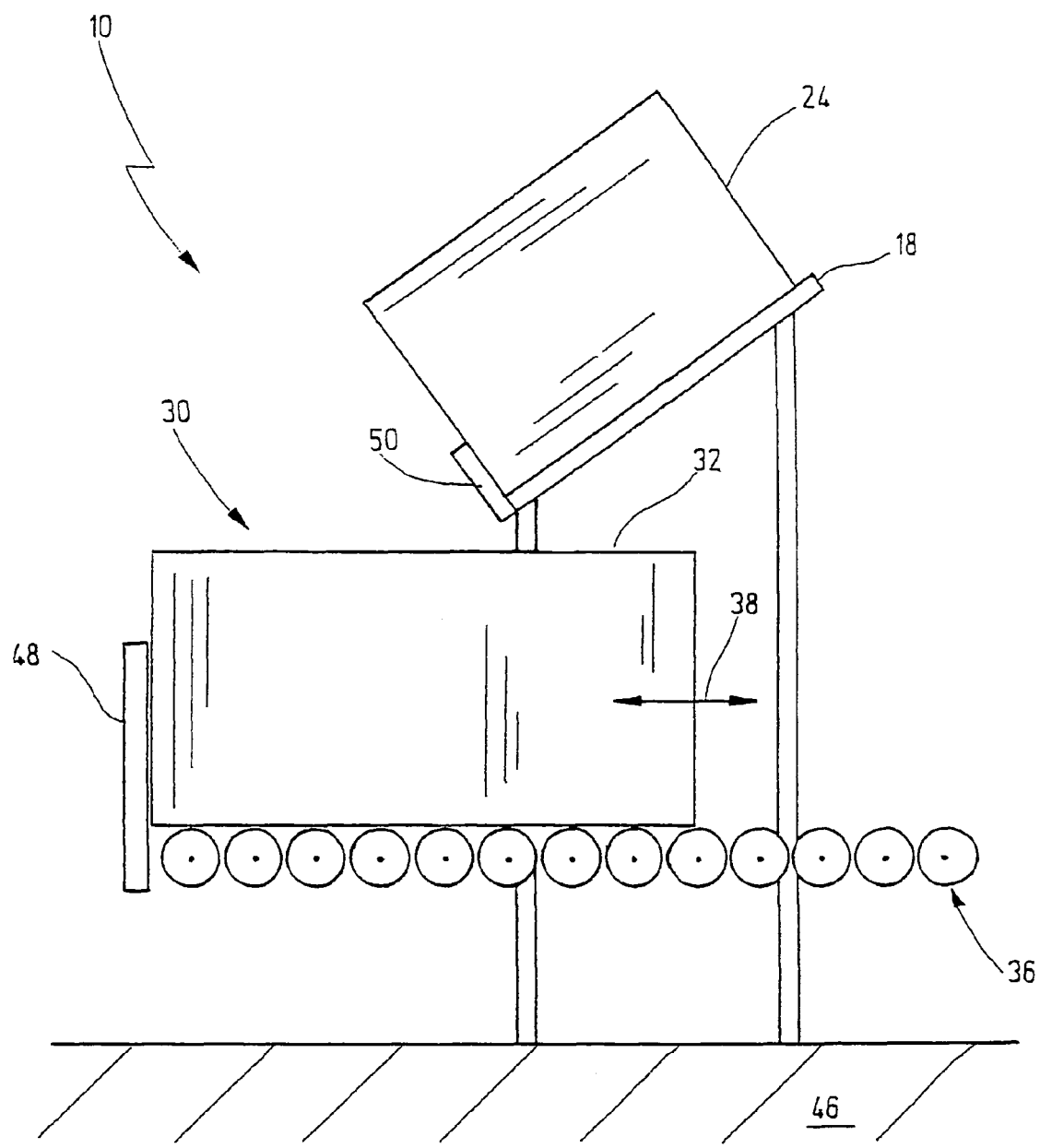
FIG. 2 shows a sectional view along the line II-II in FIG. 1 through a picking station according to the present invention.

FIG. 2 shows a sectional view along the line II-II from FIG. 1.

FIG. 2 reveals clearly that the conveying track 18 is oriented at an angle with respect to the floor 46. Arranged underneath the conveying track 18 is the further conveying system 36, with which the order containers 32 are transported into the order container buffer 30 along the arrow 38. FIG. 2 reveals the front side 48 of the buffer 30, which forms a stop for the order containers 42. In addition, the conveying track 18, which is set at an angle, at least in the working area 14, has a stop 50 in the region of the picking station 10, by means of which the storage container 24 is prevented from slipping off the conveying track 18.

Figure 3:
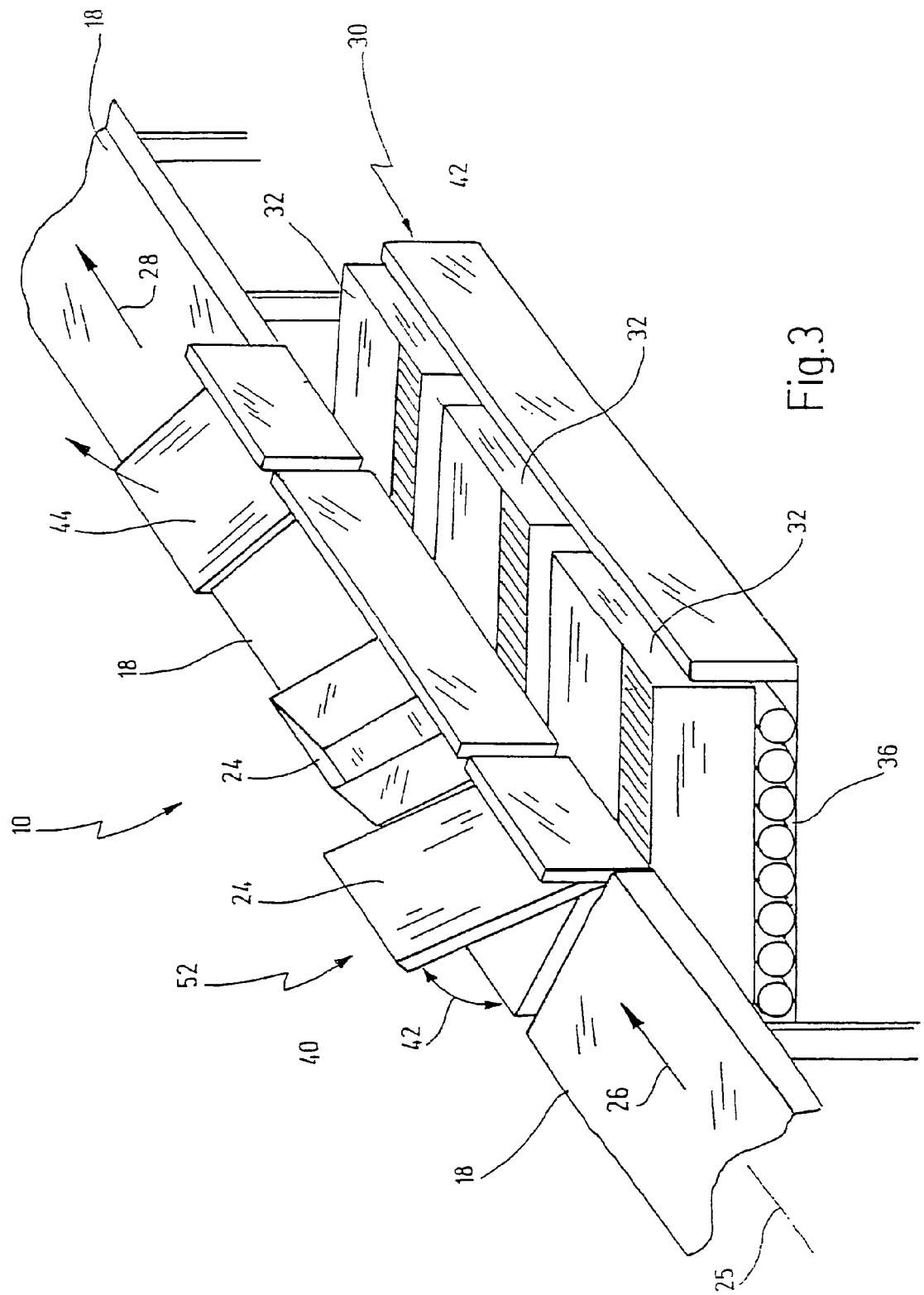
FIG. 3 shows, schematically, a perspective partial view of the picking station of FIG. 1, it being possible in particular to see a tilting device.

FIG. 3 shows the picking station 10 of FIG. 1 schematically in a perspective view.

It is possible to see clearly the tilting device 40 which, in the situation illustrated in FIG. 3, has been tilted upward, that is to say is in its tilted position. In the tilted position of the tilting device 40, the tilt area 52 by which the storage container 24 is tilted forms a plane with a part of the conveying track 18 which leads through the working area 14 of the picking station 10. Furthermore, the tilting device 40 preferably has a stop 54 which prevents storage containers 24 located on the area 52 from being able to slip off the conveying track.

The tilt-back device 44 is also oriented in its tilted position in the plane of the part of the conveying track 18 which leads through the working area 14. In its normal position, it is oriented horizontally.

Figure 4:
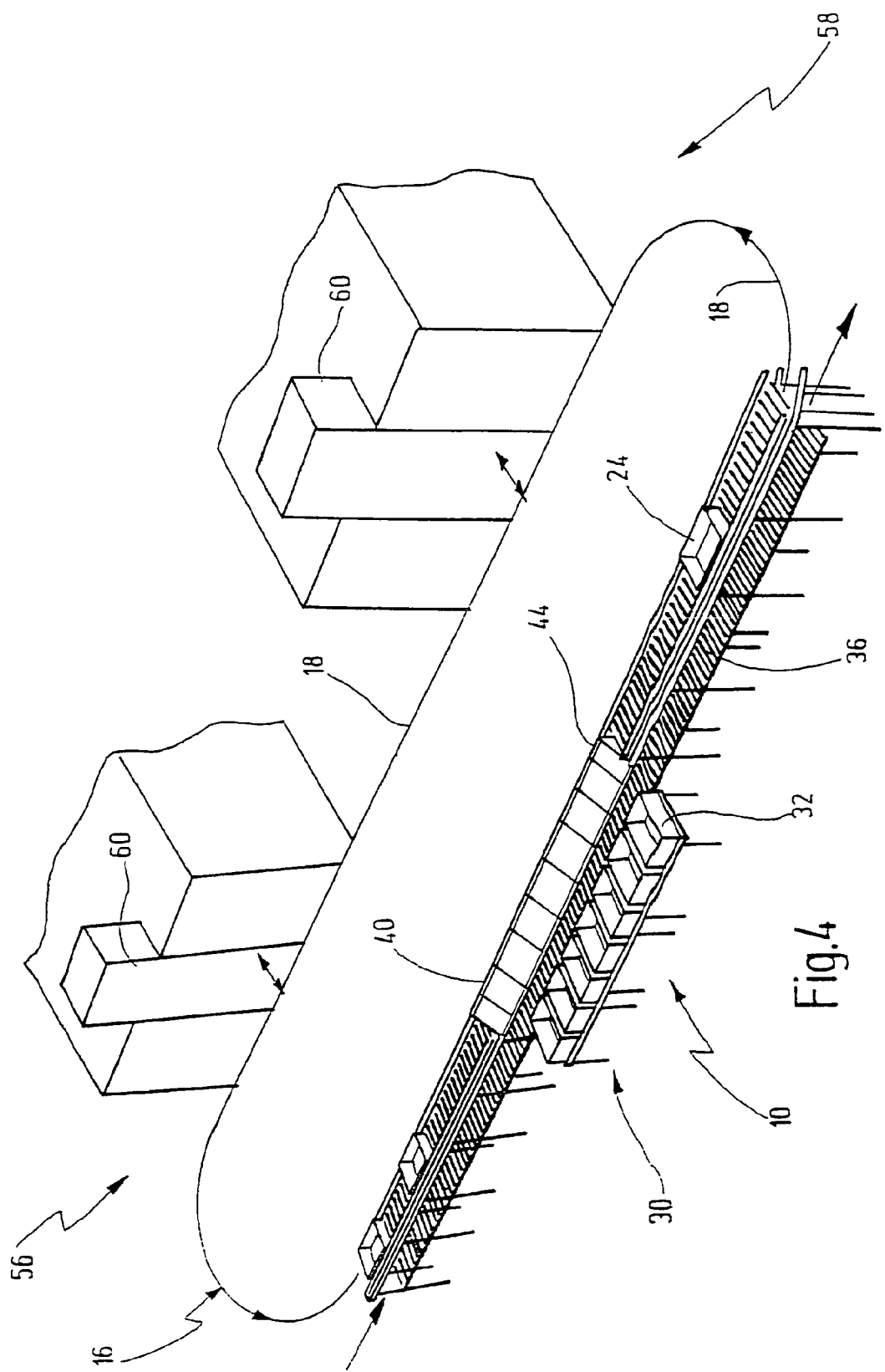
FIG. 4 shows a schematic perspective view of a picking system according to the present invention which has a picking station according to the invention.

FIG. 4 shows, schematically, a perspective partial view of a picking system 56 according to the invention. The picking system 56 comprises a workstation 10 according to the invention, a conveying system 16 for storage containers 24, a conveying system 36 for order containers 32 and a rack store 58.

The rack store 58 comprises a large number of storage racks, which here are arranged in aisles. The racks themselves are, for example, what are known as carousels. In the case of carousels, the rack columns can be rotated about vertically oriented axes, so that one rack column can always be rotated to the front of the rack. Provided on the front of the rack are what are known as vertical lifts 60, with the aid of which storage containers 24 can be removed from the rack store 58 from any desired height. The lifts 60 transport the storage containers 24 removed to a transfer height, where the storage containers can be transferred to the conveying system 16.

By means of the conveying system 16 for storage containers 24, the storage containers 24 are transported to the picking station 10, preferably in the normal position. The tilting device 40 is arranged physically shortly before the storage containers 24 arrive in the working area 14 of the picking station 10.

As already explained in connection with FIGS. 1 to 3, the tilting device 40 tilts the storage containers 24 into the tilted position and discharges the storage containers 24 in the tilted position onto the part of the conveying track 18 which passes the working area 14 of the picking station 10.

By means of the conveying system 36, the order containers 32 are transported to the picking station 10, in order to be transported away again after an order picking operation has been completed.

Storage containers 24 from which articles to be picked for an order have already been removed are transported out of the working area 14 again by means of the conveying track 18. The tilt-back device 44 is arranged after the working area 14. The tilt-back device 44 tilts the storage containers 24 back into their normal position. The storage containers 24 are subsequently guided back into the storage rack 58 again.

It is to be noted that various types of conveying systems could be used.

In addition, the size of the picking station 10, in particular of the working area 14, can be varied. For instance, the working area 14 could be enlarged by permitting the picking person 12 also to take a step to the left and to the right in order to remove articles from the storage containers. The conveying track 18 which leads through the working area 14 would have to be designed to be correspondingly longer.

It is clear that the storage container level and order container level can be interchanged. The inclination of the storage containers and of the order containers (for example in the event of arrangement in a box) is likewise possible. The height at which the storage containers are supplied into the working area of the picking station is adaptable.

In addition, the size of the buffer 30 for the order containers 32 can be varied. Depending on the size of the order containers, a different number of order containers can be accommodated by the buffer 30. The same also applies of course to the size of the storage containers 24.

Therefore, what is claimed is:

1. A picking station for picking articles out of storage containers by a picking person, comprising:
    a conveying system which is connected to said picking station for conveying said storage containers, said conveying system including a conveying track;
    said conveying track having a longitudinal axis;
    a working area configured for picking said articles from said storage containers, wherein said conveying track leads through said working area, at least allowing feeding of said storage containers to said working area; and
    wherein said conveying track is tilted about said longitudinal axis towards said picking person, at least in said working area of said picking person.

2. The picking station as claimed in claim 1, wherein said conveying track is tilted substantially in said working area of said picking person only.

3. The picking station as claimed in claim 1, wherein said conveying track further includes:

a tilting device for tilting said storage containers, which are to be transported into said working area, into a tilted position.

4. The picking station as claimed in claim 3, wherein said tilting device is arranged in front of said working area.

5. The picking station as claimed in claim 3, wherein said conveying track further includes:
a tilt-back device for tilting back said storage container from said tilted position.

6. The picking station as claimed in claim 5, wherein said tilt-back device is arranged subsequent to said working area.

7. The picking station as claimed in claim 1, wherein said conveying track is a roller track or a conveying belt.

8. The picking station as claimed in claim 1, wherein said conveying track is arranged in said working area at handling height of said picking person.

9. The picking station as claimed in claim 8, wherein said handling height is at a height from chest to hip.

10. The picking station as claimed in claim 1, wherein said working area is defined by an arm reach of said picking person.

11. The picking station as claimed in claim 1, wherein said conveying system also transports order containers, into which said articles are picked from the storage containers for processing an order, to and/or away from said picking station.

12. The picking station as claimed in claim 1, wherein said order containers are likewise tilted in said working area of said picking person.

13. A picking system having at least one picking station, said picking station comprising:
a conveying system which is connected to said picking station for conveying said storage containers, said conveying system including a conveying track;
said conveying track having a longitudinal axis;
a working area at which said picking person can pick articles from said storage containers, wherein said conveying track leads through said working area, at least for the inward transport of said storage containers; and
wherein said conveying track is tilted about said longitudinal axis towards said picking person, at least in said working area of said picking person.

14. The picking system of claim 13, wherein said conveying track further includes:
a tilting device for tilting said storage containers, which are to be transported into said working area, into a tilted position.

15. The picking system of claim 14, wherein said conveying track further includes:
a tilt-back device for tilting back said storage container from said tilted position.

16. The picking system as claimed in claim 15, wherein said tilt-back device is arranged subsequent to said working area.

17. The picking system as claimed in claim 13, wherein said conveying track is arranged in said working area at handling height of the picking person.

18. A method for picking orders, wherein storage containers are transported to a picking station, said picking station comprising:
a conveying system which is connected to said picking station for conveying said storage containers, said conveying system including a conveying track;
said conveying track having a longitudinal axis;
a working area at which said picking person can pick articles from said storage containers, wherein said conveying track leads through said working area, at least for the inward transport of said storage containers; and
wherein said conveying track is tilted about said longitudinal axis towards said picking person, at least in said working area of said picking person;
including the step of:
bringing said storage containers into a tilted position on the conveying track before said articles can be picked from said storage containers in said working area.

* * * * *